3,230,232
Patented Jan. 18, 1966

3,230,232
PROCESS FOR THE PREPARATION OF CERTAIN ANTHRAQUINONE-CARBAZOLE DYESTUFFS
James I. Carr, Dighton, Mass., assignor to I.C.I./Organics/Inc., a corporation of Rhode Island
No Drawing. Filed Dec. 17, 1959, Ser. No. 860,113
10 Claims. (Cl. 260—316)

The present invention relates to improvements in making dyes. In particular, the invention is concerned with a process for the preparation of dyes of the anthraquinone carbazole series which contain benzoylamino groups.

The primary object of this invention is to obtain vat dyes of the anthraquinone-carbazole series which contain benzoylamino groups by a relatively simple and novel process involving direct conversion of aminoanthraquinone anthrimides to benzoylaminoanthraquinone carbazole dyes.

The chemical constitution of the dyes of this series has been known for some time, but the process of the present invention provides a more efficient and economical method for obtaining dyes of this group having better tinctorial strength, novel shades and good fastness properties.

The objects of this invention can be accomplished by dissolving a dianthrimide which contains free amino groups in fuming sulfuric acid (oleum) or chlorosulfonic acid, and adding zenzoic acid, or other benzoylating agent, to the acid solution. When chlorosulfonic acid is used, both benzoylation of the amino groups of carbazolization of the anthrimides to give the dyes take place concurrently. When oleum is used, the benzoylation of the amino groups takes place first and the benzoylaminoanthrimides thus formed are converted to the corresponding carbazole dyes upon dilution of the acid and stirring.

The carbazole of 4,4'-dibenzoylamino-1,1'-dianthrimide, also identified as C.I. Vat Black 27 (Ahcovat Olive R), was discovered in 1910 by W. Mieg. Since its discovery, this dye has been made by two general methods, which are as follows:

(1) 1-amino-4-benzoylaminoanthraquinone is condensed with 1-chloro-4-benzoylaminoanthraquinone in the presence of copper in a solvent medium. The 4,4'-dibenzoylamino-1,1'-dianthrimide thus formed is separated and added to chlorosulfonic acid or sulfuric acid to form a carbazole dye.

(2) 4,4'-diamino-1,1'-dianthrimide is reacted with benzoyl chloride in an organic solvent medium, the 4,4'-dibenzoylamino-1,1-dianthrimide separated, dried, ground and added to sulfuric acid to form the carbazole dye.

The process of the present invention is much simpler than the above noted prior procedures inasmuch as 4,4'-diamino-1,1'-dianthrimide may be added to chlorosulfonic acid or sulfuric acid with a benzoylating agent, and converted directly to the carbazole dye. When 4,4'-diamino-1,1'-dianthrimide is added to strong sulfuric acid or chlorosulfonic acid, it forms amine salts and oxonium addition compounds. It is surprising that such compounds react readily with benzoylating agents, including benzoic acid, at low temperatures to form 4,4'-dibenzoylamino-1,1'-dianthrimide, and the corresponding carbazole dye. It is also surprising that the dye thus formed is not sulfonated to an objectionable degree.

Another surprising aspect of the invention is that 4,4'-diamino-1,1'-dianthrimide may be converted into 4,4'-dibenzoylamino-1,1'-dianthrimide and the corresponding carbazole dye with yields substantially higher than are obtained by the previously known methods. Additionally, it has been found that the dyes obtained in many cases have tinctorial strength considerably greater than that of the known dye (C.I. Vat Black 27).

The reaction conditions used in carrying out the process of the present invention may be varied to produce dyes having novel shades and may be adjusted as desired to produce dyes either yellower or greener than the color of the known dye, Ahcovat Olive R (C.I. Vat Black 27). The fastness properties of these novel dyes are good and they also have desirable application properties.

The following examples will serve to illustrate the invention, but are not intended to limit it. The parts are by weight, unless otherwise stated:

*Example 1*

Twenty percent oleum (400 parts) is stirred and cooled to 20° C. There are mixed together 50 parts of 4,4'-diamino-1,1'-dianthrimide, and 35 parts of benzoic acid, and this mixture is then added to the stirring oleum at 20° to 25° C. When all has been added, the acid melt is stirred until all has dissolved, and then heated to 38° C., and stirred at 38° to 40° C., for six hours, and then stirred overnight without heating. There is then added to the stirring melt at 25° to 28° C., 223 parts of 60° Bé. sulfuric acid. After this dilution, the melt is stirred at 28° to 32° C., until the color of the acid melt changes from green to brown. The melt is then cooled to 25° C., and 80 parts of water is added, and the stirring continued at 38–40° C., until the crystals of the dye are uniform when viewed under a microscope. The acid melt is then drowned in water (2500 parts) and six parts of sodium chlorate added to the acid slurry. The slurry is stirred and heated to 80° C., and held at 79° to 81° C., for 1½ hours. The dye is then filtered off and washed first with water, then with 0.25% to 0.5% caustic soda solution, and finally with water. It is then made into a dye paste by known methods. The dye forms a red-brown vat from which cotton is dyed in strong fast olive shades which are yellower than that produced by Ahcovat Olive R.

*Example 2*

Thirty-three and one-half parts of benzoic anhydride is substituted for the 35 parts of benzoic acid used in Example 1. The dye obtained is substantially the same as that of Example 1.

*Example 3*

Four hundred parts of chlorosulfonic acid is stirred and 50 parts of 4,4'-diamino-1,1'-dianthrimide added at 20° to 25° C. There is then added 37 parts of benzoyl chloride. The temperature is raised to 33° C., and the melt stirred three hours, and the stirring continued without heating until the next day. The color of the melt is red-brown. There is added to the stirring melt at 20° to 28° C., 307 parts of 60° Bé sulfuric acid and 107 parts of water. The temperature is then raised to 38° C., and the melt stirred at 38° to 40° C., until the crystals are uniform. The melt is drowned into 2500 parts of water. Six parts of sodium chloriate is added and the acid slurry heated to 80° C., and stirred at this temperature for 1½ hours. The dye is worked up as in Example 1. It dyes cotton in shades that are yellower than the shade obtained with Ahcovat Olive R.

*Example 4*

Fifty parts of 4,4'-diamino-1,1'-dianthrimide is stirred into 400 parts of 20% oleum at 25° C. There is then added over one-half hour at approximately 30° C., 37 parts of benzoyl chloride and the mixture stirred 6 hours at 40° C. It is then diluted with 223 parts of 60° Bé. sulfuric acid and stirred all night at 28 to 30° C. The mixture is poured into water, six parts of sodium chlorate added, heated to 80° C., and stirred for 1½ hours at 79° to 81° C. It is then filtered, washed with water, weak alkali, and again with water, then dried. The dry dye may be used for making powder brands, or may be acid pasted in sulfuric acid and converted to a dye paste by known methods. It dyes cotton a little greener than Ahcovat Olive R.

*Example 5*

Fifty parts of 4,4'-diamino-1,1'-dianthrimide is stirred into 400 parts of 20% oleum at 20° to 30° C. When all is dissolved, there is added 37 parts of benzoyl chloride, and the mixture warmed to 38° C., stirred 5 hours at 38° to 40° C., and then stirred a further 15 hours without heating. The melt is cooled to 25° C. and 223 parts of sulfuric acid (86.7%) is added at 23° to 27° C., and the mixture stirred until the color is brown. The melts are then added at 17° to 27° C., to 105 parts of water having dissolved in it one part dispersing agent (a naphthalene sulfonic acid condensation product). The residual melt is rinsed out using 46 parts of 98% sulfuric acid, and this added to the main portion of the mixture. The temperature is raised to 38° C. and the mixture stirred at 38° to 40° C., until the crystals are uniform. The crystallized slurry is then added to 2500 parts of water and stirred until free from lumps. Sodium chlorate, 4 parts, is added and the mixture stirred and heated to 80° C., over one hour, and held at 80° C., for 1½ hours. The dye is filtered off, washed and worked up as in Example 1. It dyes cotton in strong fast shades which are greener than those produced by Ahcovat Olive R.

*Example 6*

Fifty parts of benzoic acid and 50 parts of 4,4'-diamino-1,1'-dianthrimide are mixed together and the mixture stirred into 400 parts of 30% oleum at 15° to 20° C. The mixture is then warmed to 50° C., and stirred 6 hours at this temperature. The mixture is then cooled to 20° C., and diluted with 273 parts of 60° Bé. sulfuric acid, after which it is warmed to 30° C., and stirred 3 hours at 30° to 35° C. It is added to 80 parts of water at 20° to 25° C., warmed to 38° C. and stirred at 38° C. to 40° C., for nine hours. The melt is then added to 2800 parts of water. The acid slurry is heated with stirring to 90° C., and while heating, sodium dichromate is added as fast as absorbed, as shown by a negative test when a spot of the mixture is placed on a piece of starch-potassium iodide paper. The mixture is stirred one hour at 90° C., while maintaining a positive test for dichromate. The dye is then filtered off and washed free from soluble material. It is made into a dyeing paste by a known procedure. The dye is yellower than Ahcovat Olive R.

*Example 7*

Fifty parts of 4,4'-diamino-1,1'-dianthrimide is mixed with 35 parts of benzoic acid, and this mixture is stirred into 400 parts of sulfuric acid containing 10% free sulfur trioxide (10% oleum) at 20° to 25° C. When free from lumps, the mixture is warmed to 40° C., and stirred three hours at this temperature. It is then stirred several hours without further heating and diluted with 223 parts of sulfuric acid (86.5%). The stirring is continued at 30° C., until the color of the melt is brown. Seventy-four parts of water are then added and the mixture stirred at 38° to 41° C., for 15 hours. The acid melt is then added to 2500 parts of water. Sodium chlorate (6 parts) is added and the temperature raised to 80° C., and held at 79° to 81° C., with agitation for 1½ hours. The dye is then filtered off, washed as usual, and converted to a dye paste in the usual way. Cotton is dyed by this paste in shades that are a little greener than those produced by Ahcovat Olive R.

*Example 8*

Fifty-seven and one-half parts of 4,4'-diamino-1,1'-dianthrimide are mixed with 35 parts of benzoic acid, and the mixture stirred into 460 parts of 20% oleum at 20–28° C. The mixture is stirred until free from lumps, and then stirred 20 hours at 30° C. to 32° C. The acid melt is cooled to 20° C., and 237 parts of 86.6% sulfuric acid added at 20°–25° C., during about 30 minutes. The acid melt is warmed to 30° C., allowed to stir overnight without heating or cooling. It is then added to water (97 parts) at 25° C. to 30° C., then warmed to 38° C. and stirred 10 hours at 38° C. to 40° C. The acid melt, which contains the dye in the form of fine crystals, is poured into 2500 parts of water. The reaction vessel is rinsed out with 500 parts of water and ice, and this added to the diluted melt. After stirring to break up any lumps, sodium chlorate (6 parts) is added, and the acid slurry is heated to 78° C., and stirred 1½ hours at 78° C. to 80° C.

The dye is then separated by filtration, washed with water to remove most of the acid, then washed with dilute caustic soda solution until strongly alkaline, and finally washed with water until practical free from alkali. The resulting filter cake is converted to a dye paste by conventional procedures, and the resulting dyestuff was found to give very much yellower shades than those normally obtained with dyes of the C.I. Vat Black 27 (Olive R) type.

Although the above examples utilized specific conditions for obtaining the objects of this invention, substantially the same results may be obtained using other conditions. Thus, for example, the concentration of the free sulphur trioxide in the sulfuric acid used may be varied from 5% up, with the preferred range being 10% to 30%. Benzoic acid and benzoyl chloride are the preferred benzoylating agents, but other benzoylating agents such as benzoic anhydride may be used.

The temperatures used for dissolving the 4,4'-diamino-1,1'-dianthrimide may be increased considerably without danger of sulfonation of this intermediate. The time and temperature of the benzoylation may be varied. A preferred temperature range is 25–45° C., for from three to fifteen hours but temperatures and times outside these ranges may be used.

The carbazolization is usually performed at an acid strength of 96% to 98%, but strengths a little higher or lower may be used. Also a catalyst may be used (hydroquinone, ferrous sulfate and others), but is not required. The time and temperature during the carbazolization may also be varied, e.g. between one and fifteen hours and 30 to 35° C., but higher or lower temperatures and shorter or longer times are also useful.

As soon as the formation of the carbazole ring is complete, the dye can be worked up by any known method desired. The shade and strength of the final dye, and the final yield, are dependent to some extent on the method used.

The best results are obtained when the dyes are treated with an oxidizing agent after the carbazolization stage. This treatment may be done before or after the acid melt is strongly diluted. For example, sodium nitrite may be added to the acid melt before it is finally diluted. The diluted dye may be treated with sodium dichromate, sodium chlorate, etc., or the acid dye solution may be filtered, the dye washed, and treated with alkaline sodium hypochlorite solution.

The yield obtained by the processes of this invention are in some instances considerably higher than obtained by the processes of the prior art. Furthermore, as indicated heretofore, the dye obtained has a greater tinctorial value.

Preferably, the dianthrimide used herein is 4,4'-diamino-1,1-dianthrimide. However, other dianthrimides containing free amino groups may also be treated in similar fashion. Thus, for example, there may also be used any of the following other dianthrimides as starting materials: 4,5'-diamino-1,1'-dianthrimide, 5,5'-diamino-1,1'-dianthrimide, etc.

It will be recognized from the foregoing description that the present process for making anthraquinone-carbazole dyes containing benzoylamino groups from aminoanthraquinone anthrimides consists of three stages which are (1) benzoylation, (2) carbazolization, and (3) crystallization. All three of these steps are performed in situ, and this comprises an important feature of the invention, since it results in lower cost of operation and improved yields. When using oleum, which is the less expensive and preferred solvent, the benzoylation is performed in the oleum, the acid is then diluted with 60° Bé. sulfuric (or otherwise) to form the carbazole ring, and then the melt is further diluted and stirred to obtain the dye in a suitable physical condition. Following this, the dye melt is usually poured into water, given an oxidizing treatment, freed from acid, and worked up by conventional methods.

Various modifications may be made in the invention described herein without deviating from the scope thereof as defined in the following claims wherein:

I claim:

1. The process of preparing benzoylaminoanthraquinone carbazole dyes which comprises benzoylating and carbazolizing diaminodianthrimide by dissolving the diaminodianthrimide and a benzoylating agent selected from the group consisting of benzoic acid, benzoic anhydride and benzoyl chloride, in an acid selected from the group consisting of oleum and chlorosulphonic acid, the amount of said benzoylating agent being sufficient to benzoylate the amino groups in said diaminodianthrimide, maintaining the resulting acid melt at a temperature within the range of about 20 to 45° C. and then diluting the acid melt to obtain said carbazole dye.

2. The process of preparing benzoylaminoanthraquinone carbazole dyes which comprises benzoylating and carbazolizing diaminodianthrimide by dissolving the diaminodianthrimide and a benzoylating agent selected from the group consisting of benzoic acid, benzoic anhydride and benzoyl chloride, in oleum, the amount of said benzoylating agent being sufficient to benzoylate the amino groups in said diaminodianthrimide, maintaining the resulting acid melt at a temperature within the range of about 20 to 45° C. for up to about 15 hours until said diaminodianthrimide is benzoylated and then diluting the acid melt to an acid strength of 96 to 98% by adding sulphuric acid thereto, maintaining the diluted reaction mixture at a temperature between about 20 and 45° C. for up to about 15 hours until the benzoylated derivative is carbazolized and then further diluting said reaction medium and separating the carbazole dye therefrom.

3. The process of preparing benzoylaminoanthraquinone carbazole dyes which comprises benzoylating and carbazolizing diaminodianthrimide by dissolving the diaminodianthrimide and a benzoylating agent selected from the group consisting of benzoic acid, benzoic anhydride and benzoyl chloride, in chlorosulphonic acid, the amount of said benzoylating agent being sufficient to benzoylate the amino groups in said diaminodianthrimide, maintaining the resulting acid melt at a temperature within the range of about 20 to 45° C. until said diaminodianthrimide has been benzoylated and carbazolized and then diluting the acid melt to recover said carbazole dye.

4. The process of claim 1 wherein the aminodianthrimide is 4,4'-diamino-1,1'-dianthrimide.

5. The process of claim 1 wherein said benzoylating agent is benzoic acid.

6. The process of claim 1 wherein said benzoylating agent is benzoyl chloride.

7. The process of claim 1 wherein said benzoylating agent is benzoic anhydride.

8. The process of claim 1 wherein the acid is oleum and the melt is diluted to an acid strength of 96 to 98% to facilitate the carbazole formation.

9. The process of claim 8 wherein dilution is effected by adding sulfuric acid and water to said melt.

10. The process of claim 1 wherein the resulting carbazole dye is treated with an oxidizing agent after the carbazolization, said agent being selected from the group consisting of alkali metal nitrite, hypochlorite, dichromate and chlorate.

References Cited by the Examiner

UNITED STATES PATENTS

| | | | |
|---|---|---|---|
| 1,667,848 | 5/1928 | Gassner | 260—316 |
| 2,183,873 | 12/1939 | Schlichting et al. | 260—316 |
| 2,459,424 | 1/1949 | Hauser et al. | 260—319 |

FOREIGN PATENTS 447,545    5/1936    Great Britain.

OTHER REFERENCES

Venkataraman: Chemistry of Synthetic Dyes, vol. II, page 883, page 903 (Academic Press) (1953).

WALTER A. MODANCE, *Primary Examiner.*

IRVING MARCUS, *Examiner.*